March 22, 1966  E. J. DIEBOLD  3,242,447
SATURABLE REACTOR CORE STRUCTURE
Filed June 20, 1962  3 Sheets-Sheet 1

INVENTOR.
EDWARD J. DIEBOLD
BY
OSTROLENK, FABER, GERB & SOFFEN
ATTORNEYS

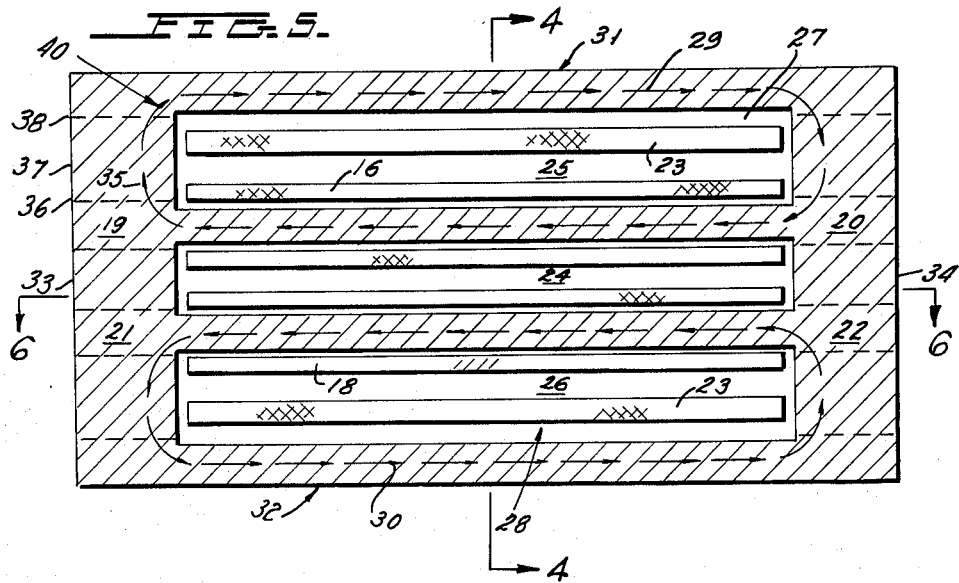
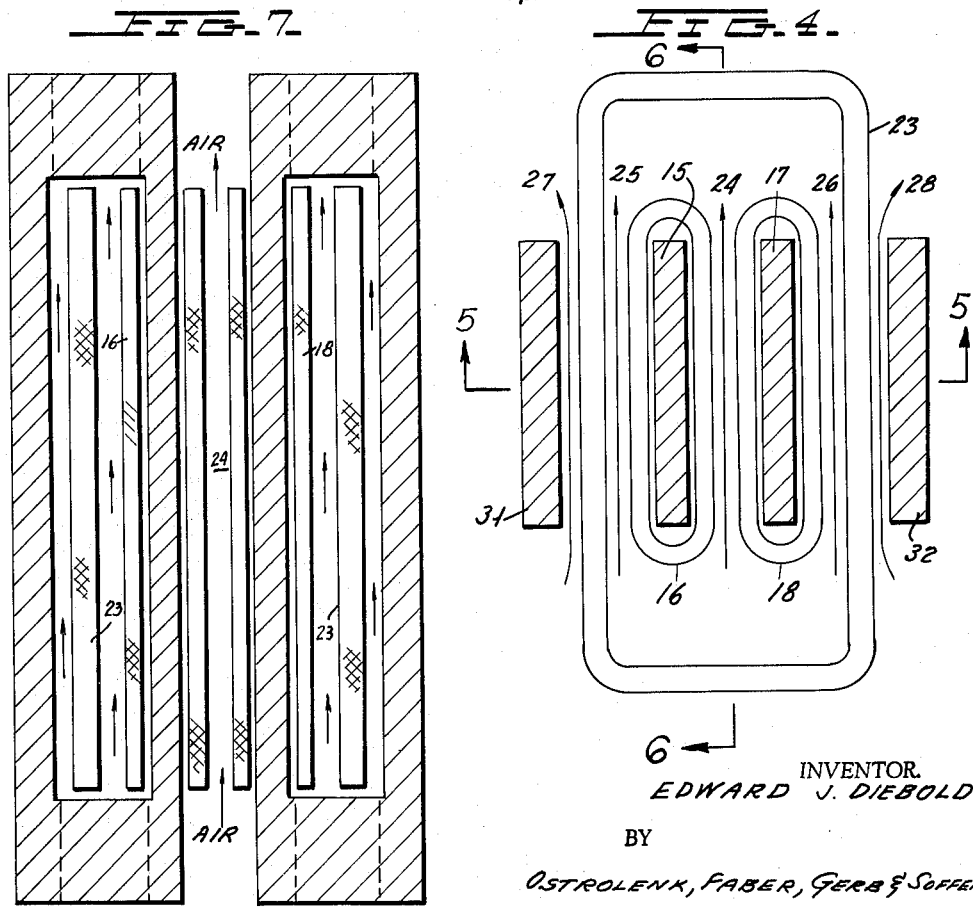

March 22, 1966  E. J. DIEBOLD  3,242,447
SATURABLE REACTOR CORE STRUCTURE
Filed June 20, 1962  3 Sheets-Sheet 3

THIS RANGE PERTAINS TO
THE MAGNETIZING EFFECT
OF THE MAIN
CURRENT

INVENTOR.
EDWARD J. DIEBOLD
BY
OSTROLENK, FABER, GERB & SOFFEN
ATTORNEYS

United States Patent Office 3,242,447
Patented Mar. 22, 1966

3,242,447
SATURABLE REACTOR CORE STRUCTURE
Edward J. Diebold, Palos Verdes Estates, Calif., assignor to International Rectifier Corporation, El Segundo, Calif., a corporation of California
Filed June 20, 1962, Ser. No. 203,833
4 Claims. (Cl. 336—160)

This invention relates to a novel saturable reactor, and more specifically relates to a saturable reactor having highly improved characteristics, and which is comprised of a first and second linear saturable reactor combined in a unitary structure.

A primary object of the invention is to produce a novel high quality saturable reactor which uses the same materials and manufacturing techniques which are currently in use.

A further object of this invention is to provide a novel saturable reactor which is less subject to saturation effects and will be more completely saturated when entering the saturation range.

A further object of this invention is to provide a novel saturable reactor structure which has improved control characteristics.

Yet another object of this invention is to provide a novel saturable reactor having improved performance characteristics which is less expensive than a presently available reactor having the same rating.

A still further object of this invention is to provide a novel saturable reactor having reduced size requirements, minimum power losses and minimum side effects such as residual impedance when fully saturated, and residual current when fully blocking.

A further object of this invention is to provide a novel saturable reactor construction which can be manufactured with a minimum of waste of material.

A still further object of this invention is to provide a novel saturable reactor which can be used in applications where the reactor has a rated output power of the order of hundreds of kilowatts.

A still further object of this invention is to provide a novel saturable reactor which is essentially formed of a first and second toroidal reactor which have been linearly formed.

Another object of this invention is to provide a novel saturable reactor in which the windings of the reactor can be wound on bobbins, and the iron core can be stacked of laminations in accordance with standard transformer manufacturing techniques.

A yet further object of this invention is to provide a novel geometry for a saturable reactor construction which eliminates many of the difficulties encountered by the normal toroidal construction and permits operation closer to theoretical conditions than the toroidal arrangement.

These and other objects of this invention will become apparent from the following description when taken in connection with the drawings, in which:

FIGURE 1b shows a side cross-sectional view of a reactor of FIGURE 1a.

FIGURE 4 is a first cross-sectional view of the structure of the novel invention and is taken across lines 4—4 of FIGURE 6.

FIGURE 5 is a second cross-sectional view of the structure of the invention wherein FIGURE 4 is found in section lines 4—4 of FIGURE 5.

FIGURE 6 is a cross-sectional view of FIGURE 5 when taken across lines 6—6 in FIGURE 5;

FIGURE 7 illustrates one possible modification of the structure shown in FIGURES 4, 5, 6 and 6a.

The invention can be best understood by following its evolution from a prior type of structure.

Figure 1A:
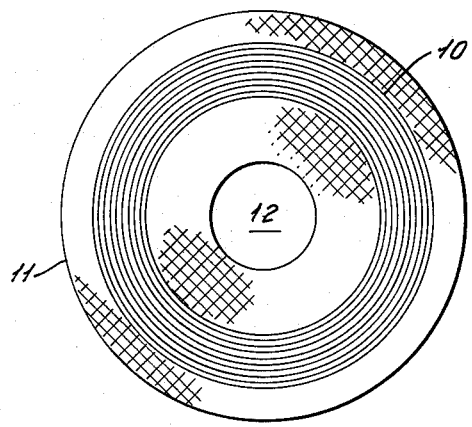
FIGURE 1a shows a cross-sectional view through a presently available toroidal saturable reactor.
Figure 1B:
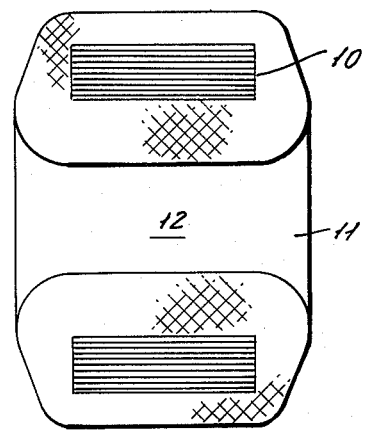

FIGURE 1 shows a toroidal iron core 10 of a wound strip of iron with a copper winding 11, as used in the prior art. The winding 11 requires an opening 12 for winding purposes. Winding 11 is very crowded in the opening 12 of core 10 and is spread out on the outer periphery of the core 10.

Figure 2:
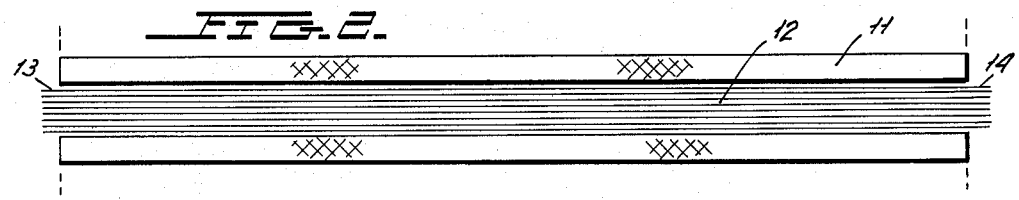
FIGURE 2 illustrates the reactor of FIGURES 1a and 1b when the iron core and winding are linearly extended.

Iron core 10 and winding 11 have been redrawn, but spread out as a straight iron core in FIGURE 2. The core is assumed to be cut apart and a magnetic joint is assumed to be made between the ends 13 and 14 of core 10. Because of the regular manner permissible for winding a winding such as the winding 11 in FIGURE 2, it takes much less space. Thus, it is closer to all points of the iron core 10, and the mean length per turn of winding 11 is much shorter in FIGURE 2. Such a winding has a lower resistance, lower air core reactance, is cheaper and is lighter. Another advantage is that the winding of FIGURE 2 has a much larger cooling surface, which means that under the same cooling conditions, a small wire can be used without overheating. The only difficulty encountered is a satisfactory magnetic connection between the points 13 and 14 which will be discussed later.

Figure 3:
FIGURE 3 illustrates the manner in which the dimensions of the reactor of FIGURE 2 can be advantageously changed so that the core can be more economically constructed and will have the identical characteristics, it being noted that FIGURE 3 is to be compared in scale to FIGURE 2.
Figure 3A:
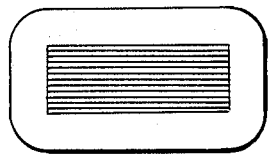
FIGURE 3a is a side view of the core of FIGURE 3.

Because of the above advantages, the geometry of the reactor of FIGURES 1 and 2 can be changed, as shown in FIGURE 3 which is to be compared in length and thickness to FIGURE 2. Because of the great advantage of winding straight linear coil 11 of FIGURE 3, the saving of space is so great that the entire coil and core can be made much shorter. Thus, the coil length of FIGURE 1 (and FIGURE 2) was reduced to 58% of its former value in FIGURE 3. Furthermore, because of the great saving in iron obtained by the reduction in the length of core 11, the cross-section of the iron core was increased by 20% to keep the weight of the iron constant. Thus, the winding, to have the same electrical effect, can be made with 20% less turns. Accordingly, the winding 11 of FIGURE 3 can be made with a smaller wire, while still keeping the same resistance as in FIGURE 1, because the total length of wire is shorter. Because there are fewer turns, the air core reactance of the winding is reduced by approximately 25%.

As FIGURE 3 shows, the buildup or radial thickness of the winding has to be increased, because of the smaller linear dimension available for the winding. Notwithstanding this, the winding 11 is still less crowded than in FIGURE 1.

The reduction of axial length in FIGURE 3 has the further result of reducing magnetizing current, or current required to produce saturation in the core 12 between the ends 13 and 14.

The design of FIGURE 3 still requires some means to carry the flux back externally, without upsetting the performance of the iron core between the end faces 13 and 14. This problem is solved, in accordance with the invention, as shown in FIGURES 4, 5, 6 and 6a, after discovering the great advantages that would flow from the arrangement of FIGURE 3.

Figure 5:
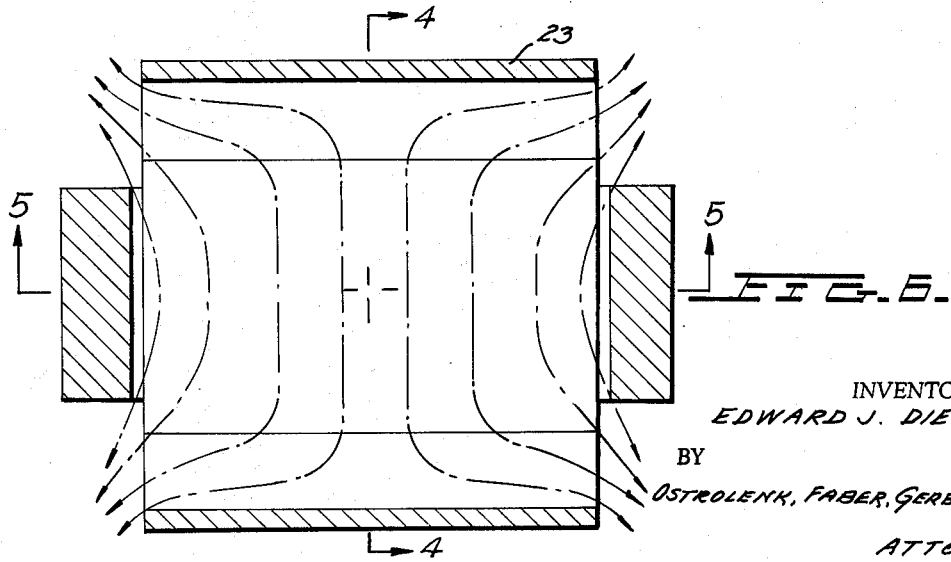
Figure 6A:
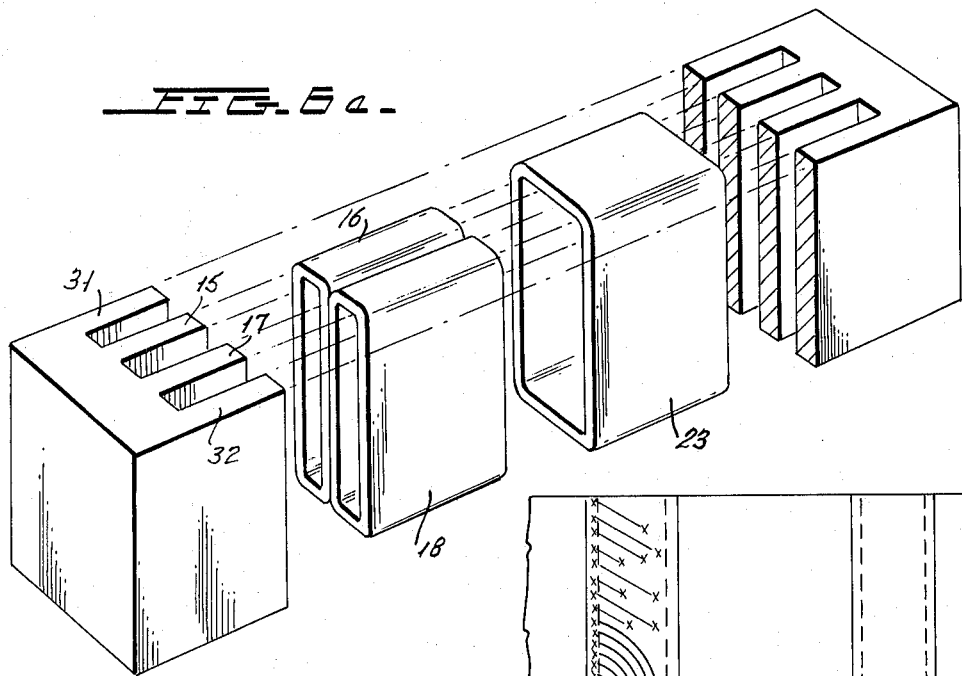
FIGURE 6a is an exploded perspective diagram of the core of FIGURES 4, 5 and 6.

FIGURES 4, 5 and 6 show three cross-sections of the device of the exploded perspective view of FIGURE 6a, each cross-sectioned at right angles from the two others. Thus, FIGURE 4 shows a vertical cross-section indicated by lines 4—4 in FIGURES 5 and 6. FIGURE 5 shows a horizontal cross-section indicated by lines 5—5 in FIGURES 4 and 6. FIGURE 6 shows another vertical cross-section indicated by lines 6—6 in FIGURES 4 and 5.

The device shown in FIGURES 4, 5, 6 and 6a essentially comprises two saturable reactors. This is advisable because saturable reactors are commonly used in pairs. The two individual reactors of the pair operate sequentially, i.e. one saturable reactor operating on one half wave of an alternating current and the other saturable reactor operating on the other half wave. These two saturable reactors consist of the iron cores and coils contained in the center of FIGURES 4 and 5. More specifically, the first saturable reactor consists of the core 15 and coil 16. The second saturable reactor consists of the core 17 and coil 18. These saturable reactors are completely and entirely contained between the ends 19 and 20 for the first saturable reactor and the ends 21 and 22 for the second saturable reactor. The remainder of the iron core serves merely as a carrying means for magnetic flux and has such properties that it does not affect the performance of the saturable reactors. The basic concept, therefore, consists of creating, in reality, an unwound toroidal reactor as theoretically shown in FIGURES 2 and 3 where the ends are joined by forming two individual reactors in a unitary structure.

It will be noted that the complete core construction of FIGURES 4, 5, 6 and 6a can be formed in the usual manner by stacking laminations of appropriate material as is usual in the transformer manufacturing art. Moreover, the windings such as windings 16 and 18 will have terminals extending therefrom (not shown), and can be wound in the usual manner on support bobbins which slide over their appropriate magnetic core legs, or the laminations of the core legs are appropriately assembled within the bobbin, which ever method of manufacture is selected.

Saturable reactors are essentially reactors with non-linear iron cores in which the behavior of the flux is controlled by the application of an external D.-C. field. The reactor itself should preferably have a high degree of nonlinearity, which means that it is very highly conductive when saturated by the external D.-C. field and very highly inductive whenever the external D.-C. field is not applied. This can only be achieved by arranging a winding as tightly and economically as possible around an iron core which is as large as feasible within the particular coil. When saturated, the coil has a residual impedance which is given by the so-called air core reactance or the reactance of a similar coil having no iron core. When not saturated, this coil has a high inductance given by the field flowing through the iron core which fills the coil as completely as possible. The higher the impedance ratio between saturated and nonsaturated conditions, the higher the quality of the reactor.

The externally applied saturating influence, i.e. the D.-C. field, has no limitations of the nature of those above described for the A.-C. coils which constitute in effect the reactor. The D.-C. coils need only surround the iron core of the reactor proper, e.g. the cores 15 and 17 in the FIGURES 4, 5 and 6. Furthermore, the D.-C. coil should have a minimum of size, power loss and weight but these considerations are secondary. In FIGURES 4, 5, 6 and 6a, this coil is shown as a single coil 23 for both reactors. As seen in FIGURE 4, coil 23 entirely surrounds the reactor coils 16 and 18 and, as shown in FIGURES 5 and 6, has the same length as the saturable reactors. Therefore, the magnetizing force of coil 23 is equally distributed over the full length of the saturable reactors. Since a single coil is applied to two saturable reactors, the coils 16 and 18 or the A.-C. reactor windings, must be connected in opposition. Thus, when the alternating current is positive, we may assume that coil 16 adds its magnetizing force to the coil 23, whereas coil 18 subtracts its magnetizing force from coil 23. Upon reversal of the alternating current, coil 16 will be in opposition to coil 23, and coil 18 will be in additive with respect to coil 23.

Considering only the magnetic coils 15 and 17, contained within the saturable reactors, the effect of the coils 16, 18 and 23 can now be understood. If coil 23 is energized with a magnetomotive force of substantial magnitude, the cores 15 and 17 will be fully saturated in the direction of the magnetomotive force of coil 23. Both cores 15 and 17 will carry a magnetic flux in the same direction, emerging, for example, from the ends 19 and 21 and re-entering the cores from the ends 20 and 22. The outer parts of the magnetic core system are assumed to be large and heavy enough so that their reluctance is negligible compared to cores 15 and 17 of the magnetic system. Therefore, the cores 15 and 17 will be fully saturated, whereas the remainder of the magnetic system will not be saturated.

Applying an alternating current to coils 16 and 18, either by connecting the two coils in parallel, but magnetizing in opposite directions or by connecting them in series, also magnetizing in opposite directions, creates an additional magnetomotive force in the cores 15 and 17. At one part of the cycle the magnetomotive force in core 15 will be constituted by a current in coil 23 and in coil 16 flowing in the same direction, thus having a higher magnetomotive force. Since the core 15 is already saturated, an additional magnetomotive force cannot create further saturation. Thus, there is no change of flux in this core and there is no induced voltage in coil 16. In the same half cycle the core 17 is subjected to the difference in magnetomotive force between coil 23 and coil 18, assuming that the magnetomotive force of coil 23 is larger than the magnetomotive force of coil 18. In this case, because core 17 is easily magnetized, the flux in core 17 is only very slightly reduced, because the residual magnetomotive force which is a difference between coils 23 and 18 is still substantial, compared to the very low magnetizing current required to saturate core 17. Thus, core 17 remains saturated and no flux change is experienced. Accordingly, for small currents flowing through coils 16 and 18 (either in series or parallel) these coils have a very low impedance and the voltage drop across them is very low.

Increasing the current in the A.-C. coils 16 and 18 to a level which is comparable to the magnetomotive force of the coil 23, will bring a very sudden change when the magnetomotive force of the A.-C. coils 16 and 18 and D.-C. coil 23 becomes equal. Having a very good saturable reactor, constituted by either the core 15 or 17, means that at equality of magnetomotive force, a very slight difference of current will cause the corresponding core to become unsaturated. The further state of magnetization of the particular core thereafter depends on the voltage applied to its associated coil. It will require a definite amount of voltage and time to achieve a certain change of flux and an equal value of voltage times time to return the flux to the original stage of saturation. Thus, if the current in the coils 16 and 18 causes a magnetomotive force which is equal to the magnetomotive force of coil 23, when these magnetomotive forces add between coils 16 and 23, no change of flux is experienced in core 15, but now they subtract for core 17 which is unsaturated. Thereafter, the magnetomotive force of coils 18 and 23 will be forced to remain equal and opposite, except for the very small difference which is caused by magnetizing current.

A voltage applied to the circuit to force a change of current will simply cause a change of flux in the core 17. Because it is an alternating circuit, this voltage will reverse after a time and a negative voltage of equal magnitude and time will be required to achieve the former state of saturation, after which the current of coil 18 can decrease again and is free to change. At the corresponding opposite direction of current in the next half cycle, the same process will be repeated. If the D.-C. current which causes the magnetomotive force of coil 23 is held rigidly constant, this means that the currents of coils 16 and 18 will also be held constant for the duration of the time that the cores 15 or 17 are not saturated. The effect of the saturable reactor, therefore, will be a strict and definite limitation of the current which passes through coils 16 and 18.

The above described phenomena are common to all saturable reactors, at least in theory. Saturable reactors of the type of FIGURE 1 will not meet the theoretical operation because of basic imperfections in their design. These imperfections stem mainly from the fact that the saturable cores 15 and 17 cannot properly saturate because the outer magnetic circuit cannot provide sufficient flux to them at all times, which is essentially the normal and basic theory of operation. It should be noted that the normal condition of a saturable reactor is to have its core saturated. The current clipping effect is achieved by unsaturating of the core, i.e. at the maximum of the current. Saturable reactors which do not fully saturate, will not achieve simple and constant limitation of the current peak, but cause a current distortion which is difficult to analyze because it depends on many different factors.

Another drawback of the poor inherent design of the toroidal reactor is that the saturable reactor must be over-saturated by the D.-C. coil. Thus, a substantial current differential must be available to produce unsaturation. This means that the core is never completely unsaturated and, therefore, the impedance does not rise to its maximum value. In the novel structure of FIGURES 4, 5, 6 and 6a, there is an equality of magnetomotive forces. This provides complete unsaturation with a very small difference of magnetizing current between the two magnetomotive forces, and hence a very high voltage change for only a very small current deviation for a definite time.

In FIGURES 4, 5, 6 and 6a, the two legs 15 and 17 of the core are the only true saturable reactors of the entire system, terminating at the ends 19, 20, 21 and 22 in an external magnetic system which is essentially inconsequential for operation of the device. Accordingly, the space around these saturable reactors with the coils 16 and 18 can be relatively freely arranged, to provide good cooling and ease of manufacturing. FIGURES 4 and 5 show cooling canals such as canal 24 between the two A.-C. coils 16 and 18 with the flow lines of air indicated in FIGURE 6 by arrows. Cooling air can flow freely from the ends into the widely open coil 23 and raise in the cooling canal 24. Other cooling canals 25 and 26 are provided between the D.-C. winding 23 and the outer surfaces of the A.-C. windings 16 and 18 with a similar flow of air shown by the arrows in FIGURE 4. Further cooling canals 27 and 28 are provided to cool the outer side of the D.-C. coil, as shown in FIGURE 4.

Since cores 15 and 17 are straight, flux in the iron is parallel and is easily realized with the presently available oriented iron and straight cylindric coils. Hence the magnetization effects on the cores 15 and 17 are identical through the entire cross-section of each core, without showing preference for any particular fibers within the core. Similarly, if a plurality of coils is required, as where biasing and control is combined into the coil 23, their effect will be equal for both saturable reactor cores 15 and 17 and for all the fibers within them, as long as the partial coils of coil 23 will be equally distributed over the entire length, as by winding them in layers upon each other. Needless to say that these theoretical requirements coincide also with the most economical manufacturing techniques, because straight iron lamination and straight coil winding are the easiest and simplest operation in transformer manufacture.

All of the foregoing assumes that the external magnetic field will not hinder the operation of the saturable reactor. As stated above, a saturable reactor is fully saturated in its basic or rest condition. The field deviates from saturation only when limiting the current to its peak value, this deviation evidently occurring only in a decreasing manner. Complete reversal of flux to achieve saturation in the opposite direction is generally not considered, because it involves a mode of operation which is beyond the normal application of saturable reactors. Even if complete reversal of magnetization is achieved and saturation occurs in the opposite direction, the field cannot rise beyond this value, but merely achieves a maximum in the opposite direction.

Considering the magnetic field in its normal or rest condition, the magnetic flux is shown in FIGURE 5 by arrows 29 and 30. By proper design of the external core, fluxes 29 and 30 are limited by the complete saturation of the cores 15 and 17 between the ends 19, 20, 21 and 22. The basic premise for the operation of the saturable reactor is that this saturation of cores 15 and 17 is achieved by a low magnetizing current. Accordingly, the flow of flux in the external cores, for example from the ends 19 to the ends 20 through the outer leg 31 or the flow of flux from the end 21 to the end 22 through the outer leg 32 should occur easily, i.e. requiring only a very low magnetomotive force.

From the foregoing description, it is apparent that the end portions 33 and 34 of the magnetic circuit located between the two A.-C. cores 15 and 17 are sometimes inactive. They have been added because they add mechanical strength to the structure and provide a flux equalization possibility between the two outer cores which reduces the reluctance by the principle of the least resistance. For so-called parallel connected saturable reactors in which the A.-C. coils 16 and 18 are connected in parallel but in opposite directions, the flux changes simultaneously and in opposition in the cores 15 and 17 between saturation and an unsaturated value. For these applications, the core portions 33 and 34 of the core are very useful because they achieve flux balance between the simultaneous fluxes of cores 15 and 17. Saturable reactors with series connected A.-C. windings do not show this mode of operation.

In many practical cases of series connected reactors it will be desirable to eliminate the core portions 33 and 34 of the magnetic core by adding external members to provide the mechanical strength. This is particularly desirable if the core is mounted in such a way that the coil axis and cores are vertical. In this case, FIGURE 5 becomes a vertical cross-section and then the cooling canal 24 is closed by the unnecessary parts 33 and 34 of the iron core.

FIGURE 7 shows the embodiment of FIGURE 5 with core portions 33 and 34 removed.

During any phase of the normal operation of the series connected saturable reactor, core 15 or 17 in FIGURE 5 will always remain fully saturated, whereas the other core may also be saturated or go through a partial cycle of desaturation and flux change. In the arrangement of FIGURE 5, the reduction of flux can occur by reducing the flux of both external cores 31 and 32 simultaneously, whereas in the arrangement in FIGURE 7, the flux of one of the outer cores will remain constant at its maximum value and will decrease and eventually reverse. This change of flux is resisted by the effects of hysteresis and eddy currents in the iron. These effects are greatly dependent on the iron flux density change. Thus, the arrangement of FIGURE 5 minimizes (by the principle of least resistance) these dynamic effects of the external cores.

The principle of this invention is based upon the concept that all saturation effects of the iron take place in the cores 15 and 17 and that the external parts of the core are of no effect. This assumption can only be justified if one can prove that the reluctance of the external magnetic flux paths is always very low. The emphasis in this case must be that the reluctance must be low when the flux is at its maximum value and that this reluctance is low for all the parts which are connected in series in the path.

Turning to FIGURE 5, consider the magnetic flux emerging from core 15 at end 19 and returning externally through the core 31 into the other end 20. This flux undergoes several changes of direction and flow paths which must be analyzed one by one and in which all obstacles of high reluctance must be entirely eliminated. The analysis of this path shows that it is symmetric, and consists of two identical halves, one between the magnetic orifice 19 and the center line A—A and the other one between this center line and the other magnetic orifice 20. Considering only the first half, several distinct sections can be recognized as magnetic obstacles. The first section is the flux bend 35 which changes the direction of the flux in the core 15 to the direction of the flux in the core 37. The second magnetic obstacle is the joint 36 formed during stacking of the core and indicated as a dotted line. Joint 36 itself contains several obstacles such as flux flowing across the grain, localized saturation effects and flux flowing through air from one lamination to another. The next obstacle is the yoke portion 37. The next obstacle is another joint 38 which contains all of the obstacles of joint 36. There is then another change of direction or bend indicated as bend 40, which changes the direction of flux from the yoke 37 into the core 31. Evidently the greatest complexities of these magnetic obstacles are in the bends 35 and 40 and in the joints 36 and 38, since the yoke 37 and core 31 carry straight magnetic flux through iron which may be oriented in the same flow direction. This can be discussed by means of FIGURE 8 which applies to the use of oriented silicon iron laminations of a standard type.

Figure 8:
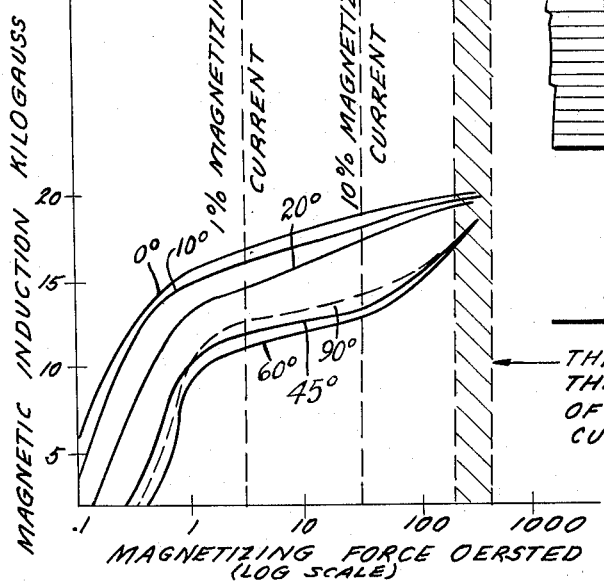
FIGURE 8 shows a plot of magnetizing force as a function of magnetic induction for various angles between flux flow direction and iron orientation direction.

FIGURE 8 shows magnetic induction in kilogauss plotted against the decimal logarithm of the magnetizing force measured in oersteds. FIGURE 8 contains six curves each designated by an angular displacement between the flow of flux and the magnetic orientation of the iron. For cores 15 and 31 and for the yoke 37 the flux flows in the same direction as the orientation of the iron which means that the curve designated by 0° applies. To interpret the curve, we may remember that the magnetic induction is an expression of the amount of flux per unit of area, whereas the magnetizing force pertains to the amount of magnetic resistance per unit of length. The magnetic circuit under consideration is simple to analyze inasmuch as we know that the worst case, that is the largest flux, exists when the core 15 is entirely saturated. This same flux must flow through the straight sections 37 and 31. For core 31 we know that its length is equal to the length of core 15; if it should have a negligible reluctance, its magnetizing force should be of negligible magnitude. This can be achieved by making the iron core cross-section area of core 31 larger than the iron core cross-section area of core 15. Since the depth of those two cores is equal, as shown in FIGURE 4, the increase in area is achieved by increasing its width, as shown in FIGURE 6.

FIGURE 8 shows that the magnetizing effect of the main current is usually between 200 and 500 oersted. The magnetizing current, which is the difference between A.-C. and D.-C. current should be quite small as compared to the magnetizing effect of the main current, for example between 3 and 30 oersted. The equivalent induction in core 15 is approximately 18 kilogauss. A negligible reluctance in core 31 would be one requiring a magnetizing force of only approximately 1 oersted, which corresponds to an induction of approximately 15.5 kilogauss. This reduction of the magnetic induction or flux density is simply achieved by increasing the width of the core 31 by approximately 16% over the width of core 15. The same is true for the width of the core 32, as compared to core 17.

Concerning the short yoke 37, the same considerations apply, except that its relative length, as compared to core 15, is quite small and therefore its influence upon the magnetic circuit is even less. As shown in the figure, this yoke is made much wider for considerations which are dictated by the joints 36 and 38, these joints being of such overwhelming importance that the yoke dimensions must be determined by them.

For the bends 35 and 40 we must consider the behavior of magnetic materials which are magnetized across the grain. This is shown in FIGURE 8. The magnetizing curves taken at various angles show that there is a very substantial difference in magnetization when deviating only slightly from the rolling direction. The greatest deviation exists at 60° change of orientation. At right angle, i.e. at 90° the change is less than at 60°, but still so large that it cannot be neglected. The lower curves for 45, 60 and 90 degree orientation can be brought to the level of the highest curve by reducing the vertical scale from 100% to 72%. This can be achieved by increasing the iron cross-section by 38% for carrying the same flux. Increasing the width of the yoke 37, as shown in FIGURE 5, has the beneficial effect that the flux density in the cross direction is reduced to a very low value. This reduction is necessary for the reason stated above for the change of direction of the flux, and is also useful to reduce the reluctance of the external circuit below the reluctance of the core 15. Another reason for widening the yoke far beyond the width of the core 15 is the fact that the flux flowing in two laminations in the core is concentrated into one lamination in the yoke as described below. Practically the width of the yoke, without consideration of the double flux per lamination, would be preferably 160% of the width of the core, which reflects an increase of 38% for cross-grain flux and 16% for decrease of per unit reluctance. Because of the doubling required in the design of the joint, the width of the yoke is calculated theoretically at 320% the width of the core 15. In reality, the reluctance introduced by the joint is so low, because of the short length of the magnetic path in these areas, that a width of the yoke of 300%, as compared to the width of the core is sufficient.

Figure 9:
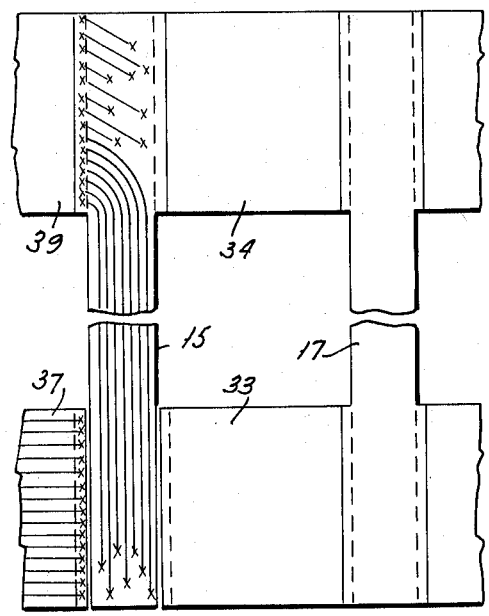
FIGURE 9 illustrates one manner in which the novel core of FIGURES 4, 5, 6 and 6a can be stacked with alternately stacked laminations.

The joint between the core lamination of core 15 and the yoke lamination of yoke 37 is achieved by overlapping alternating laminations, as shown in FIGURE 9. FIGURE 9 represents only the central part of a saturable reactor in which the cores have been completely foreshortened and show only the yokes 37 and 39. The center yokes 33 and 34 are assumed to be unmagnetized, with the entire magnetic flux going to the outer yokes, as indicated on the left hand side. The cores are assumed to be stacked from straight strips of oriented steel, these strips having a small widening on one end. This gives each strip the shape of a T with extremely short arms. As an example, these lateral protrusions may be 1/8 to 3/16" wide, as compared to a strip width of one inch. Strips are alternately stacked with the wide parts either on top or the bottom, as indicated by the dotted lines which indicate the next lower and the next upper layer of laminations. Typical lamination thicknesses are .012" or .014", as compared to a strip width of one inch.

FIGURE 9 indicates flux lines as wavy lines proceeding inside the strips. On the top left hand side, the flux comes from a core strip, bending to the left and disappearing across the interface between this trip and the next yoke lamination, this disappearance marked as a small cross. Other flux lines stem from the cross flux emanating from the strip laying below the strip in FIGURE 9, indicated as small crosses, this flux going also to the left to the short overlapping section of the yoke and disappearing again as small crosses. The lower part, left-hand side, of FIGURE 9 shows how the straight flux in the core lamination disappears across the face in the underlying or overlying lamination (as indicated on top of FIGURE 9 wherein the flux is carried to the side and reappears in the yoke lamination to be carried away laterally). Similarly, the flux coming from the underlying lamination passes directly laterally to the yoke through the small overlap and disappears laterally. Accordingly, the yoke is only half filled with iron, i.e. the yoke in the upper figure not being covered by a lamination but being empty. As shown in FIGURE 9, the magnetic flux passes only through iron laminations of narrow cross-sections in the cores themselves. When entering the yoke the flux widens and disappears sidewise or flows across the face between two laminations into the next lamination and is taken away to the side.

Saturation effects in the joint are avoided by making all the magnetic flux areas of larger cross-section than the core. Each core lamination is for example one inch wide and .014" thick, corresponding to an area of .014 square inch. The flow through the face from lamination to lamination occurs on two opposite faces simultaneously, over a width of approximately 0.15" in one direction and 1.5" in the other direction which corresponds to .45 square inch or an area which is 32 times larger. This means that the flux density between laminations across the interface which separates them, is only $\frac{1}{33}$ of the flux density in the lamination itself. As was shown above for the points where flux bends, the flux density across the grain is also so low that it has no influence on the reluctance. The very low flux density between the laminations across their interface was selected because the permeability of the air and insulating materials between the laminations is much smaller than the permeability of the iron. The influence of these air spaces upon the reluctance of the entire core can be compared by comparing the reluctance of the core of the saturable reactor to the reluctance of four air spaces through which the flux has to flow in making one complete turn. The average length per air space is only .046", as compared to an equivalent iron length of five inches. This means that the iron length over air length is 10,000. Furthermore, the flux path area of the air is approximately 32 times larger than for the iron. The permeability of the iron, however, is approximately 15,000 times higher than for the air (in those places in the magnetic circuit in which the reluctance must be kept low). With these figures we obtain a theoretical ratio of the iron reluctance over air reluctance of approximately 21, which means that the air reluctance is negligible.

The specific design described herein can, of course, be varied, depending on the manufacturing techniques which are desired. One method is to stack cores 15 and 17 with alternating laminations, as shown in FIGURE 9 and wrapping these cores tightly with insulating tape. The ends of these cores can be fitted into wooden blocks and clamped together so that the entire core can be mounted into a winding lathe and the A.-C. windings can be wound directly upon the iron cores. This assures a minimum size for the A.-C. windings. After these cores and windings are finished, they are mounted together with the D.-C. coil, and the remainder of the iron core is stacked around them.

Another method is to stack the entire core similar to a transformer by laying all the windings down on their side in a jig which holds them in place and stacking the cores through the openings in the coils alternately from one side and the other. The yoke sheets are inserted between the core strips as the stacking proceeds. The entire assembly is finally clamped together in the usual manner with transformer constructions.

Although this invention has been described with respect to its preferred embodiments, it should be understood that many variations and modifications will now be obvious to those skilled in the art, and it is preferred, therefore, that the scope of this invention be limited not by the specific disclosure herein but only by the appended claims.

What is claimed is:

1. A saturable reactor; said saturable reactor comprising a core having four legs of magnetic material; a first and second of said legs receiving first and second A.-C. windings respectively; said first and second legs receiving a common control winding arranged to encircle said first and second legs and their said respective first and second A.-C. windings; said third and fourth legs of said four legs serving as return paths for the magnetic flux of said first and second legs respectively; and yoke means for magnetically oriented coupling the adjacent ends of said four legs; said third leg having a cross-sectional area of the order of at least 15% greater than the cross-sectional area of said second leg; said fourth leg having a cross-sectional area of at least 15% greater than the cross-sectional area of said first leg; said third and fourth legs each having a cross-sectional area greater than each of said first and second legs; said yoke having a flux carrying area of the order of at least 38% greater than the flux carrying area of said first and second legs; said core being formed of stamped magnetic laminations; said laminations forming said first and second legs and said laminations forming said yoke means being connected to one another by an overlapping connection.

2. A magnetic device comprising a first reactor formed of a first A.-C. winding wound on a first elongated magnetic core, a second A.-C. winding wound on a second elongated core, magnetic return circuit means for magnetically coupling one end of said first elongated core to the other end of said first elongated core and one end of said second elongated core to the other end of said elongated core, and control winding means wound on both of said first and second elongated magnetic cores; said magnetic return circuit means comprising a third and fourth elongated core positioned external of said control winding and yoke means coupling the ends of said third and fourth cores to the ends of said first and second cores said third elongated core having a cross-sectional area of the order of at least 15% greater than the cross-sectional area of said second elongated core; said fourth elongated core having a cross-sectional area of at least 15% greater than the cross-sectional area of said first elongated core; said third and fourth elongated cores each having a cross-sectional area greater than each of said first and second elongated cores.

3. A magnetic device comprising a first reactor formed of a first A.-C. winding wound on a first elongated magnetic core, a second A.-C. winding wound on a second elongated core, magnetic return circuit means for magnetically coupling one end of said first elongated core to the other end of said first elongated core and one end of said second elongated core to the other end of said elongated core, and control winding means wound on both of said first and second elongated magnetic cores; said magnetic return circuit means comprising a third and fourth elongated core positioned external of said control winding and yoke means coupling the ends of said third and fourth cores to the ends of said first and second cores; said first, second, third and fourth cores and said yoke means being formed of stacked magnetically oriented laminations said third elongated core having a cross-sectional area of the order of at least 15% greater than the cross-sectional area of said second elongated core; said fourth elongated core having a cross-sectional area of at least 15% greater than the cross-sectional area of said first elongated core; said third and fourth elongated cores each having a cross-sectional area greater than each of said first and second elongated cores; said yoke means having a flux carrying cross-sectional area of the order of at least 38% more than the flux carrying cross-sectional area of said first and second elongated magnetic cores.

4. The device substantially as set forth in claim 1 wherein said yoke means includes spaced stacked laminations; the space between said spaced stacked laminations being equal to the thickness of said laminations; the height of said yoke laminations being approximately three times the height of said laminations forming said first and second elongated core.

References Cited by the Examiner
UNITED STATES PATENTS

| | | | |
|---|---|---|---|
| 1,224,210 | 5/1917 | Reed | 336—214 |
| 2,267,382 | 12/1941 | Vance | 336—215 X |
| 2,300,964 | 11/1942 | Putman | 336—218 X |
| 2,738,458 | 3/1956 | Walsh | 336—155 X |

JOHN F. BURNS, *Primary Examiner.*